Feb. 6, 1951   J. T. ANDERSON ET AL   2,540,804
MANGANESE ACTIVATED ZINC BARIUM SILICATE PHOSPHOR
Filed April 1, 1949
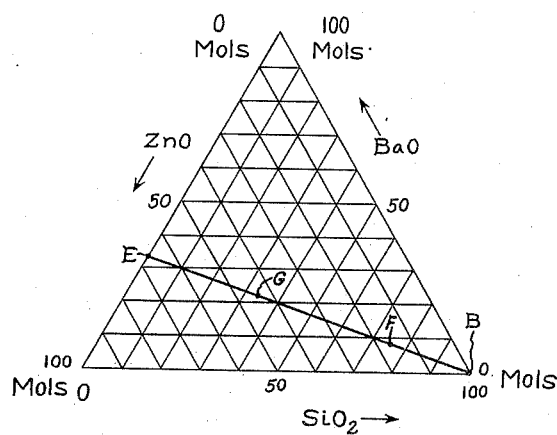
Inventors:
James T. Anderson,
Robert S. Wells,
by Morton D Morse
Their Attorney.

Patented Feb. 6, 1951

2,540,804

UNITED STATES PATENT OFFICE 2,540,804

MANGANESE ACTIVATED ZINC BARIUM SILICATE PHOSPHOR

James T. Anderson and Robert S. Wells, Rugby, England, assignors to General Electric Company, a corporation of New York Application April 1, 1949, Serial No. 84,976
In Great Britain April 9, 1948

5 Claims. (Cl. 252—301.6)

This invention relates to improvements in luminescent materials which are capable of being excited by ultra-violet radiation, cathode rays, and the like, and are suitable for use in electric discharge lamps as a screen material for cathode ray tubes as a component material for use in fluorescent paints and for like purposes.

At present many materials are known which together cover a visible spectral range in their luminescence from blue to red. For luminescence falling in the middle of this range a large number of materials are available, but at each end of the range the choice becomes more limited, especially at the red end of the range. Known materials, which have a red luminescence when excited by short ultra-violet radiation around 2537 Å are zinc-beryllium-silicate, cadmium borate, and calcium-cerium-manganese phosphate; of these, calcium-cerium-manganese phosphate gives the deepest red luminescence, with the peak of its emission curve at about 6500 Å., compared with that of cadmium borate at 6200 Å. It might be thought that the difference in appearance between materials peaking at 6200 Å. and 6500 Å. would be small; this is, however, not the case since if cadmium borate is compared directly with calcium-cerium-manganese phosphate it appears to be orange-red to the eye.

We have evolved a material emitting a deep-red luminescence with the peak of its emission curve at about 6750 Å. when excited by ultra-violet radiation around 2537 Å. The material is also capable of being excited by cathode rays, and to some extent by ultra-violet radiation around 3650 Å.

A luminescent material according to the invention comprises zinc-barium silicate of general formula $2ZnO.BaO.xSiO_2$ (where $x$ has a value between 1.7 and 12) activated with manganese.

The materials may conveniently be designated by reference to the accompanying ternary diagram in which the percentages are calculated in molecules (rather than in the usual way, in weights) of the three components.

Luminescent materials according to the invention thus have, referring to the diagram, molecular compositions which are represented by that portion of the limb BE lying between F and G, where F represents $2ZnO.BaO.12SiO_2$ and G represents $2ZnO.BaO.1.7SiO_2$ and show a uniform deep red luminescence when activated with manganese.

A material of the composition $$2ZnO.BaO.1.6SiO_2$$

showed almost no fluorescence.

If large proportions of $SiO_2$ are added, i. e., if a move is made down the line EB towards the point F there is a diminution in the intensity of fluorescence, which is relatively small until a composition of $2ZnO.BaO.6SiO_2$ is reached, after which the diluting effect of the silica becomes more apparent, and after the point F $$2ZnO.BaO.12SiO_2$$

has been passed, the fluorescence becomes very weak, finally extinguishing at B—100% $SiO_2$.

If more ZnO than $2ZnO.BaO$ is used, there is a dilution of the red $2ZnO.BaO.xSiO_2$ material with green fluorescent zinc silicate, which becomes more apparent as the ZnO ratio is increased, particularly since the green of the zinc silicate is more visible to the eye than the red.

Conversely if the BaO proportion is increased there is a dilution of the red fluorescent material with non-fluorescent barium silicate.

For the best results $x$ should be between 1.7 and 6, and preferably be closer to 1.7 than 6, for example 2.

The manganese is preferably added as $$MnCl_2.4H_2O$$

in solution in water or water ethyl alcohol mixture, but we do not exclude the use of other suitable manganese compounds. The quantity is preferably 5% of $MnCl_2.4H_2O$ per mixed dry ingredients, but may be varied between 2½% and 10% without much depreciation of the phosphor. Beyond these limits there is appreciable decrease in fluorescent brightness.

The preferred raw materials from which the luminescent materials of the invention are prepared are $BaCO_3$ of "analar" purity, ZnO of "Analar" purity, and a suitably fine, reactive form of silica, such as is known to be required by these versed in the art of making fluorescent materials. The ZnO, and $BaCO_3$ can be replaced by suitable compounds which during the subsequent firing process to which the mixed materials are subjected would make ZnO, and BaO available for reaction with the $SiO_2$.

The $MnCl_2.4H_2O$ is of "Analar" purity.

The desired quantities of the dry ingredients are intimately mixed, the correct amount of manganese chloride solution is added, and mixed therewith, and the mixture dried in the oven, and reground and thoroughly mixed.

The mixture is fired in suitable crucibles, e. g., silica, at a temperature of 1100° C. ±50° C. in periods of ½ to 2 hours at a time, according to quantity, until maximum brilliance is attained. This may take 5 hours or more. Some variation in the firing temperature is permissible, but the material should not be melted; the reaction is slow below 1000° C.

A preferred composition may be prepared by mixing the following quantities of the ingredients:

$BaCO_3$, 19.75 grams (approx. 1 mol BaO)
ZnO, 16.30 grams (approx. 2 mol ZnO)
$SiO_2$ (containing 5% water), 14.15 grams (approx. 22 mol anhydrous $SiO_2$)

Adding the $MnCl_2.4H_2O$ solution and treating as indicated above.

What we claim as new and desire to secure by Letters Patent of the United States is:

1. A zinc-barium silicate luminescent material having the general formula $2ZnO.BaO.xSiO_2$ where $x$ has a value between 1.7 and 12, the luminescent material being activated by a quantity of manganese equal to that obtained by utilizing $MnCl_2.4H_2O$ in an amount from 2½% to 10% of the mixed dry ingredients of the luminescent material.

2. A zinc-barium silicate luminescent material having the general formula $2ZnO.BaO.xSiO_2$ where $x$ has a value between 1.7 and 6, the luminescent material being activated by a quantity of manganese equal to that obtained by utilizing $MnCl_2.4H_2O$ in an amount from 2½% to 10% of the mixed dry ingredients of the luminescent material.

3. A zinc-barium silicate luminescent material having the general formula $2ZnO.BaO.xSiO_2$ where $x$ has a value of approximately 2, the luminescent material being activated by a quantity of manganese equal to that obtained by utilizing $MnCl_2.4H_2O$ in an amount from 2½% to 10% of the mixed dry ingredients of the luminescent material.

4. The method of preparing a barium-zinc silicate luminescent material which comprises mixing barium carbonate, zinc oxide and silicon dioxide (containing approximately 5% water) in relative weights of approximately 19.75, 16.30 and 14.15 adding 2½% to 10%, by weight of the mixed ingredients of $MnCl_2.4H_2O$ and firing the mixture at a temperature of 1050° C. to 1150° C. until maximum brilliance is obtained.

5. The method of preparing a manganese activated luminescent material having the general formula $2ZnO.BaO.xSiO_2$ where $x$ has a value between 1.7 and 12 which comprises mixing powdered ZnO, $SiO_2$, and a BaO yielding compound in the ratio required to produce a material having said formula, adding $MnCl_2.4H_2O$ in a quantity of 2½% to 10% by weight of the powdered mixture and firing the product at 1050° C. to 1150° C.

JAMES T. ANDERSON.
ROBERT S. WELLS.

REFERENCES CITED

The following references are of record in the file of this patent:

UNITED STATES PATENTS

| Number | Name | Date |
|---|---|---|
| 2,108,683 | Leverenz | Feb. 15, 1938 |
| 2,118,091 | Leverenz | May 24, 1938 |
| 2,169,046 | Headrick | Aug. 8, 1939 |